United States Patent Office 2,888,718
Patented June 2, 1959

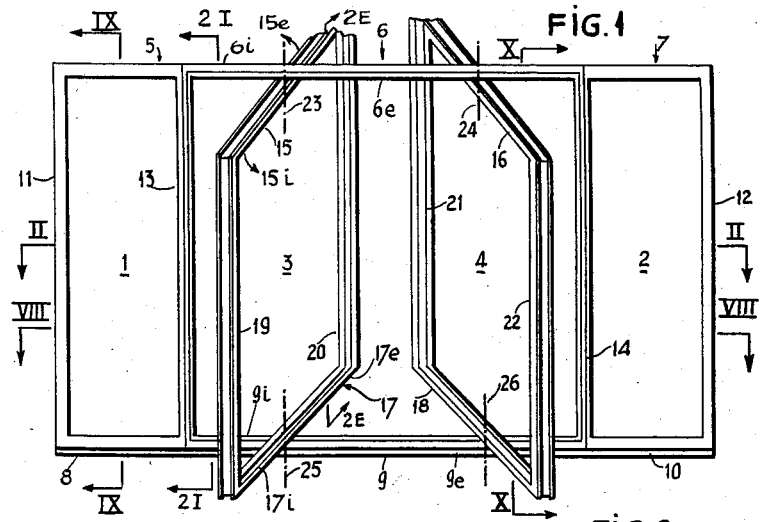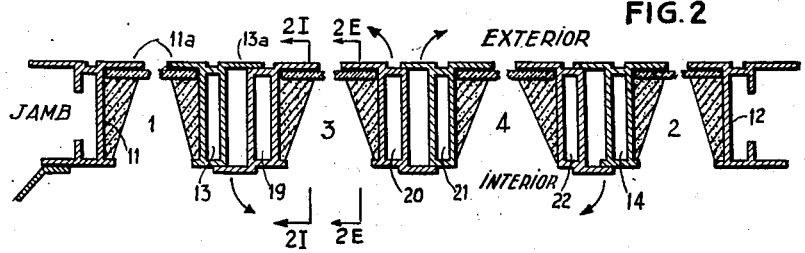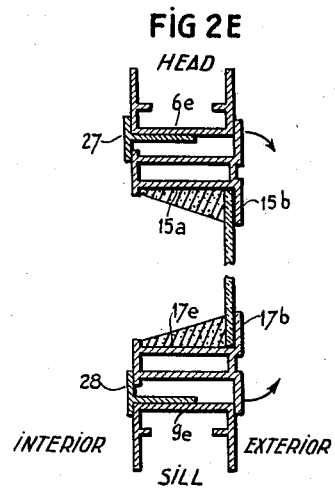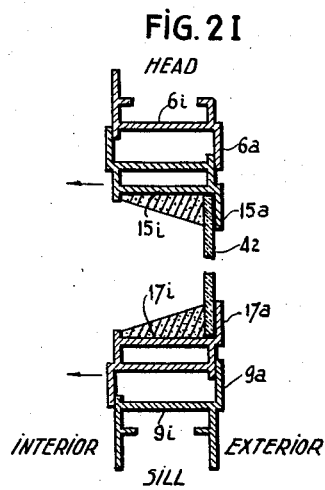

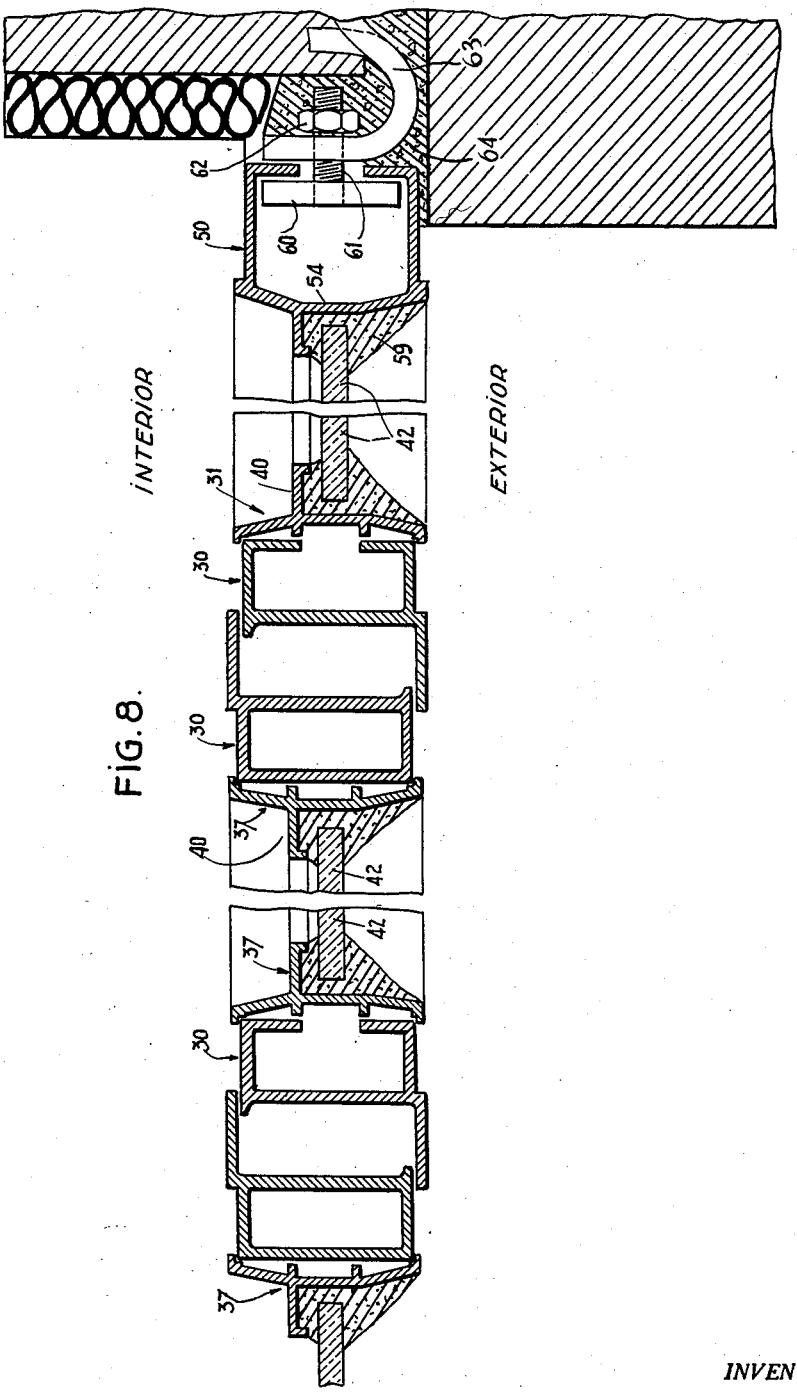

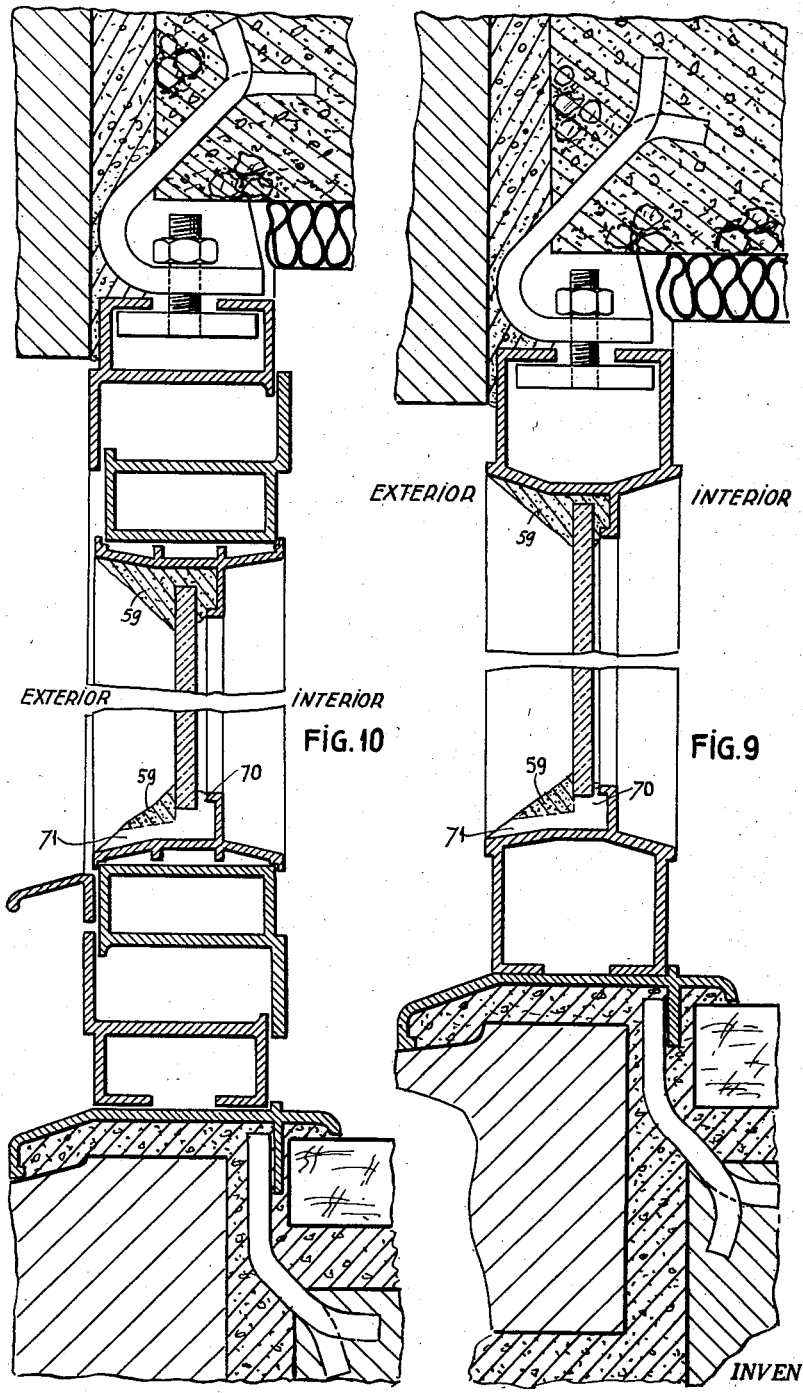

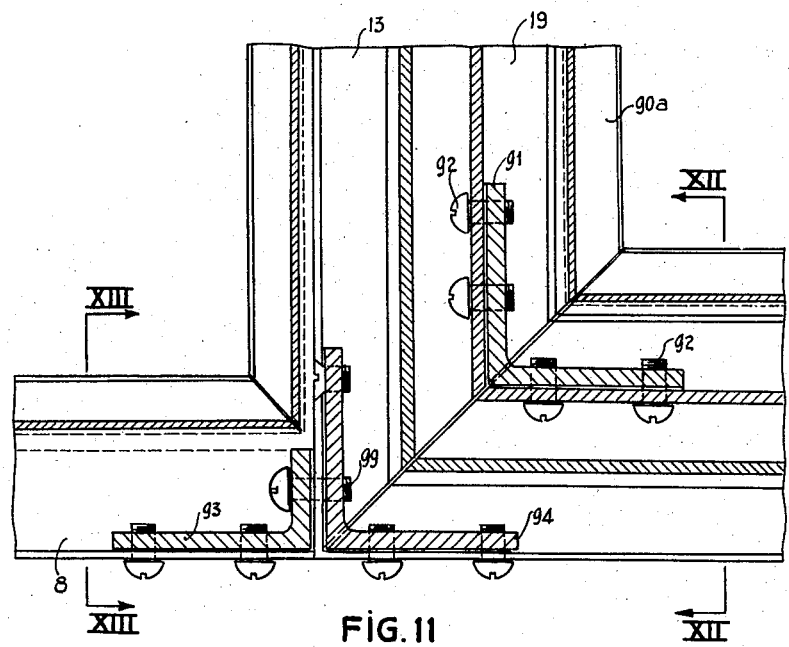
FIG. 11
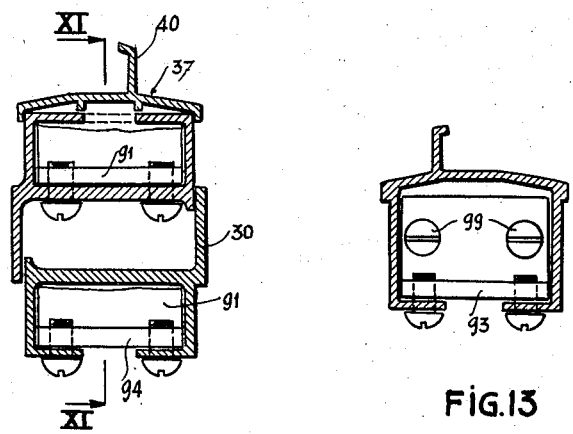
FIG. 12
FIG. 13

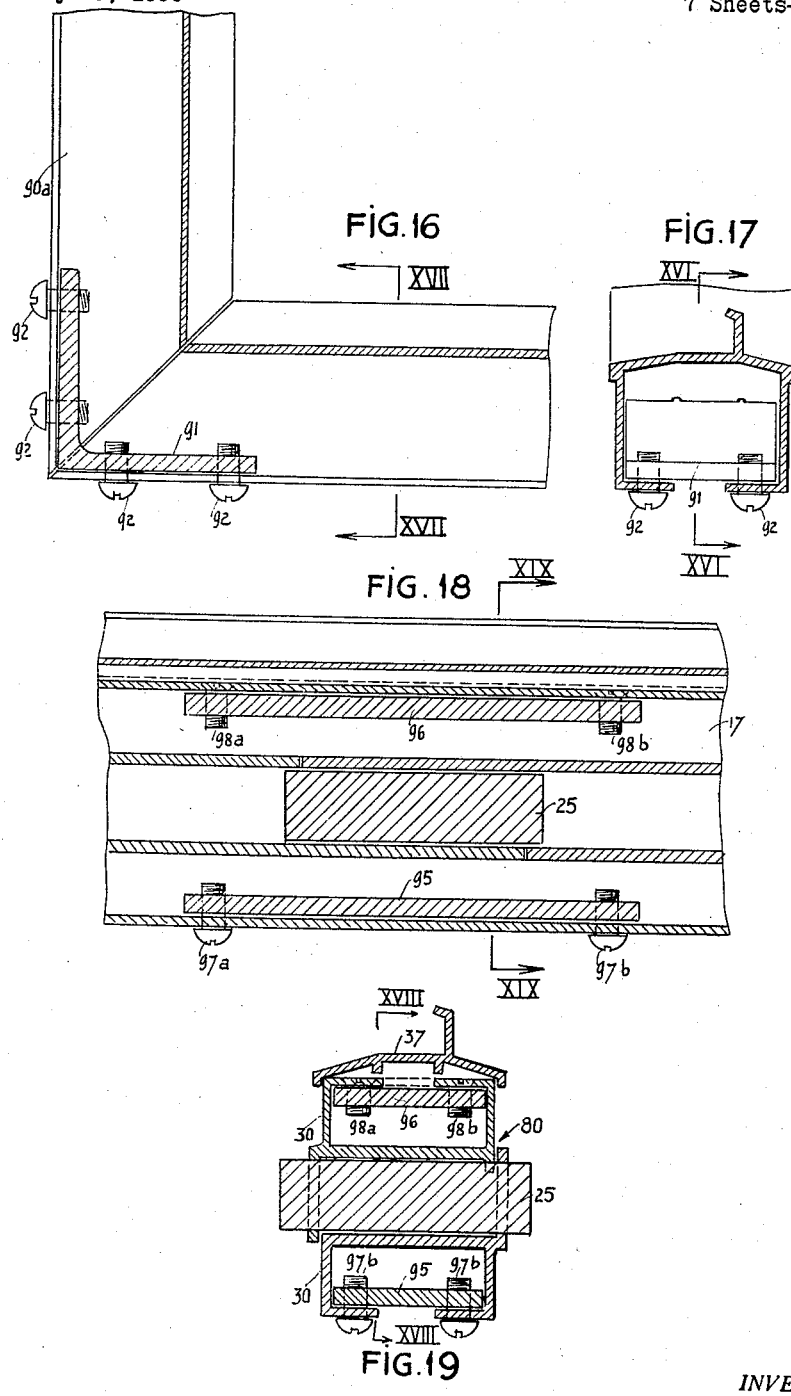

2,888,718
FRAME CONSTRUCTION
Pierre Gilles-Joseph Francotte, Merksem, Belgium
Application May 29, 1956, Serial No. 588,129
5 Claims. (Cl. 20—11)

This invention relates to a new type of light metal frames, particularly window frames and door frames made of aluminum.

It is an object of this invention to provide a standard frame the individual sections of which have the same kind of basic profile, and thereby to reduce considerably the production costs of frames especially as used in buildings.

It is another object of this invention, to provide a frame system that is individually adapted to the different degrees of strain exerted upon the different sections of said frame.

Frames as used for doors or window comprise a stationary part, fastened to the building and a movable part coming into contact with the stationary part when closing the door or window. Traditional types of frames require three different kinds of profiles for the construction of the wing and at least another distinct kind of profile for the sash. The profile required for the construction of the fixed stationary part of the frame consists of two different parts: one part is used to attach the frame permanently to the building, the other part is needed in order to fasten the wing to the sash or stationary part when the door or window is to be closed.

In addition, traditional frames do not allow for an adaptation of their various parts to the different degrees of strain exerted upon the frame.

The use of several different kinds of profiles has proved to be a great handicap for the wide employment of frames manufactured from light metals, and in particular from aluminum. In spite of the excellent qualities of aluminum for the production and assembly of frames for doors and windows, such frames are little used thus far because of the high cost of in particular their assembly. Aluminum frames will be widely used if costs of their production and assembly can be reduced and their insertion into a building can be effected by unskilled labor.

My invention remedies these disadvantages by providing a standard frame comprising but one main type of profile, thereby facilitating the production of a low-cost standard frame which is easy to assemble.

By providing additional supplementary profiles of the same basic type, but having slight variation, my frame is composed of individual sections that are well adapted to the varying degrees of strain exerted upon them.

The present invention uses one type of profile for the window frame and the part of the sash frame meeting the window frame. This profile is called "base profile" or box profile.

In addition to this "base profile" there is a supplementary profile for the part of the wing frame supporting the window pane, or, in doors, a panel of any desired material.

This profile is called the "top" or cap profile.

Finally there is a profile for that part of the stationary casement frame which is adapted at the same time to be mounted in the wall and/or the other hand to receive the window pane. This profile combines the same shape and the same dimensions as to the profile, with at its side supporting the window pane, the same shape as the base profile, at the side fastened to the masonry. This profile is called "fixed" profile.

My invention will be better understood from the description given hereinafter with the accompanying drawings in which:

Figure 1 illustrates in perspective view a window comprising two fixed and two vertically pivoted wing parts; this figure serves for explaining the differences of assembly between the known frame sections and the sections having a profile according to my invention.

Figure 2 illustrates a cross section along line II—II of Fig. 1, of a window built with a known type of frame windows.

Fig. 2I is a cross sectional view along line 2I—2I in Fig. 1 of a window of known construction;

Fig. 2E is a cross sectional view along line 2E—2E in Fig. 1 of a window of known construction;

Figure 8 shows a horizontal cross section along lines VIII—VIII of Figure 1 of a window built from sections according to the invention.

Figure 9 shows a vertical cross section along line IX—IX of the fixed portion of the window shown in Fig. 1 and constructed from sections according to the invention.

Figure 10 shows a vertical cross section along line X—X in Fig. 1 of the ventilator constructed from sections according to the invention.

Figure 11 is a partly sectional view of a corner of a frame of my invention composed of completely assembled linear frame sections which are joined together by attachment means described further below.

Figure 12 is a cross sectional view along line XII—XII in Fig. 11 and shows the manner of joining a completely assembled linear frame section composed of a base profile and a top profile with another such frame section to form a frame corner according to the invention.

Figure 13 is a cross sectional view along line XIII—XIII in Fig. 11 and shows the manner of joining a linear frame section composed of a fixed profile with another such frame section to form a frame corner according to the invention.

Figure 16 is a partly sectional view of a corner of a frame of my invention composed of two linear frame sections consisting of a fixed profile which are joined together by the attachment means described further below.

Figure 17 is a cross sectional view along line XV—XV and shows the fixed profile with the attachment means described further below.

Figure 18 is a partly sectional view of a linear frame section composed of two linear frame sections consisting of completely assembled base profiles and a top profile, the two sections being joined together by the attachment means described further below.

Figure 19 is a cross sectional view along line XVI in Fig. 18.

Figure 3:
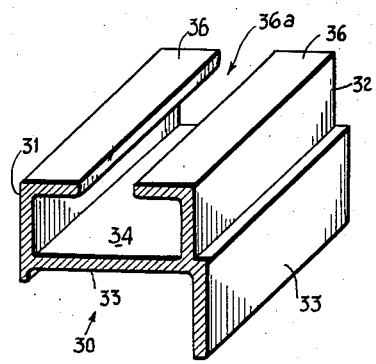
Figure 3 illustrates a perspective view of part of a base profile section of the frame according to my invention.
Figure 4:
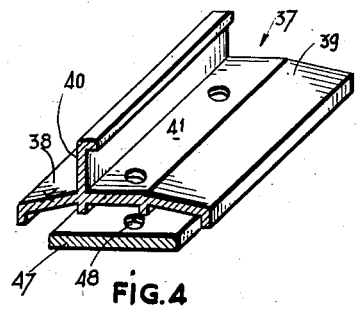
Figure 4 illustrates a perspective view of part of a pane profile section of the frame according to my invention.
Figure 5:
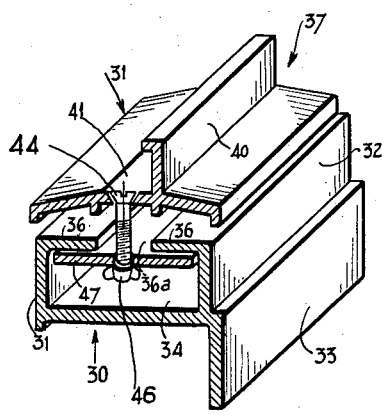
Figure 5 shows in cross sectional view the sections of Fig. 3 and Fig. 4 assembled to form a composite frame section according to my invention.
Figure 6:
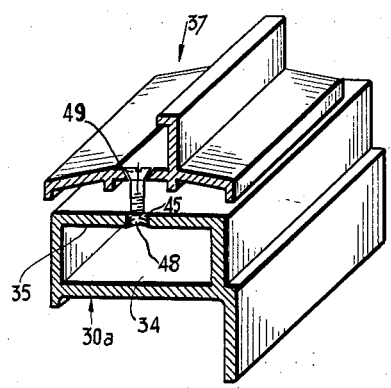
Figure 6 shows another embodiment of the base profile section shown in Figure 3 with a pane profile section connected thereto to form a composite section.

More in detail, Figure 1 shows a window having two fixed window portions 1 and 2 and two ventilators 3 and 4. The casing of the window is composed of the head portions 5, 6 and 7, the sill portions 8, 9, and 10, the jambs 11 and 12, and the mullions 13 and 14.

Ventilators 3 and 4 are shown in open position. Their frames consist of ventilator head sections 15 and 16, sill sections 17 and 18, and side or jamb sections 19, 20 of ventilator 3 and 21, 22 of ventilator 4. The ventilators are vertically pivoted at 23, 24, 25 and 26 by means for instance of conventional nickel pivots.

Figure 2 shows a cross section of Figure 1 in which the entire casing is built from conventional channeled T and Z sections, and special casing sections to be mounted on the masonry surrounding the window. As can be readily seen from this cross section casing sections are used for jambs 11 and 12, T sections are required for mullions 13 and 14, but also, for instance, for side section 21 of ventilator 4, while Z sections can be used for side sections 19 and 20 of ventilator 3, and for section 22 of ventilator 4.

However, portion 15i of head section 15 which portion opens toward the interior and the corresponding casing portion 6i require different sections than head section portion 15e which opens toward the exterior, and the corresponding casing portion 6e. This is illustrated in Figures 2I and 2E. The solution of this problem requires in all known constructions that the flanges 6a of the sill casing section and 9a of the head casing section be cut away which must be replaced by intermediary T-bars 27 and 28 on the opposite side of the sections. Naturally, this leads to a considerable weakening of these sections and makes construction of the window costly.

In contrast thereto the window construction according to the invention makes its possible to avoid all cutting away and consequently all weakening of frame sections or parts thereof. The only cuts required are cuts at an angle of 45° where two sections are joined together to form a corner.

The profile frame sections according to my invention are illustrated in Figures 3 to 14. In these figures the base profile 30 is so shaped that its walls 31 and 32 on the opposite side of the contact side 33 of the profile form a hollow tubular chamber 34. The outer side wall of this tubular chamber is either uninterrupted (35, Fig. 6) or interrupted (36, Fig. 5) by a longitudinal slot 36a thus forming a closed or partially opened chamber, according to the particular use described below.

The top profile 37 has two sloped surfaces 38 and 39 and a flange 40 mounted on the central substantially horizontal portion 41 of the top profile.

Flange 40 serves for mounting a glass pane or door panel 42 in a substantially central position on the top profile, thus avoiding the complications arising from external or internal mounting of the glass in conventional windows.

Internal mounting would require reverse arrangement of flanges 11a, 13a, 15a, 15b and 17a, 17b in Figures 2, 2I and 2E.

The top profile 37 is mounted upon the base profile 30a of the uninterrupted side wall type (Fig. 6) by sliding the former upon the latter. The top profile is then affixed to the base profile by screws 44 screwed through threaded bores 45 and wing nuts 46 of rectangular shape hidden in the tubular chamber 34.

Instead of wingnuts it is also possible to use a continuous flat iron latch 47 provided with threaded holes 48.

Figure 7:
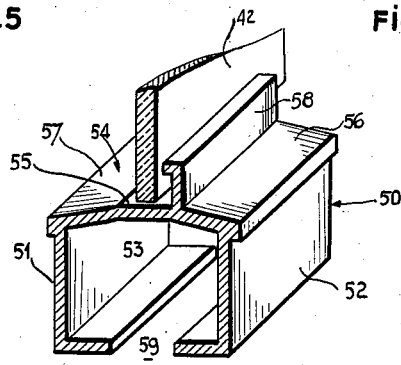
Figure 7 shows in perspective view a fixed profile section according to the invention.
Figure 14:
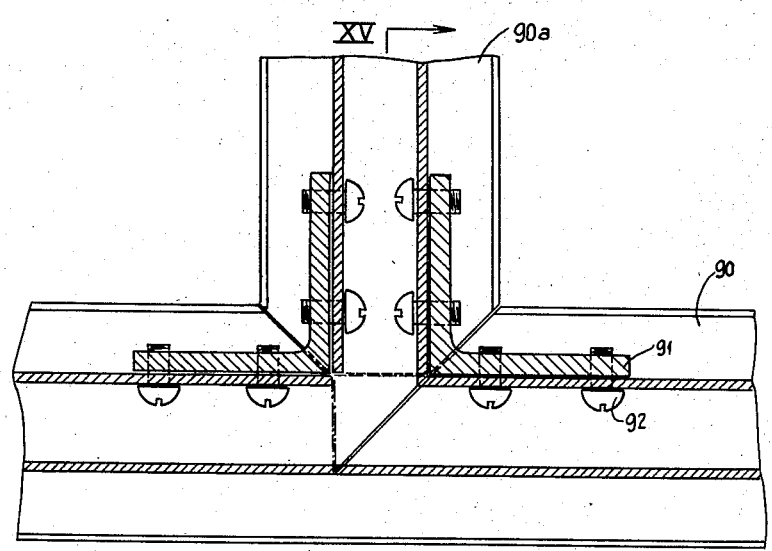
Figure 14 is a partly sectional view of a corner of a frame of my invention composed of two linear frame sections consisting of a base profile of the open channel type, which are joined together by the attachment means described further below.
Figure 15:
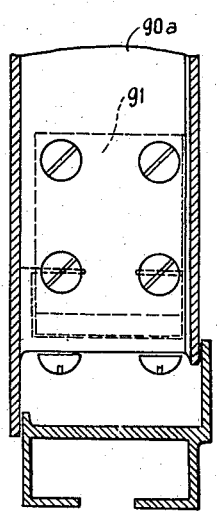
Figure 15 is a cross sectional view along line XIV—XIV in Fig. 14.

The fixed profile 50 illustrated in Figure 7 comprises two angular flanges 51 and 52 forming a tubular channel 53 with the top part 54. This top part has a central portion 55 substantially at right angle to the side flanges 51 and 52, and portions 56 and 57, as well as a central upright flange 58 which serves for mounting a glass pane, door panel or the like. The cross section of the top part 54 and flange 58 is the same as that of top profile 37 and flange 40, which can easily be seen by comparing Figures 4 and 7.

At the opposite side of top part 54, the profile 50 is provided with a longitudinal slot 59 for the insertion of a holding means such as a latch 60, threaded bolt 61, nut 62, and mounting hook 63 by which means the fixed profile 50 is mounted in the masonry 64. Pane 42 is mounted in central position relative to top part 54 of profile 50 and supported by flange 58, by means of putty 59.

In the interrupted channel wall type of base profile 30, the mounting arrangement comprising the longitudinal slot 36a and latch 47 allows for a displacement of the respective profiles relative to each other, thus providing the combination that is best suited for any particular part of the frame system. This constitutes a great advantage of my invention, for the various parts of the whole frame structure have to support a strain that greatly varies from one part to another. Thus, the fixed profile 50 can be used where there is no or practically no strain exerted upon the frame structure, as, for instance, the side of the sash frame attached to the masonry.

The closed base profile 30a having the top profile 37 affixed thereto by means of screws 44 and wingnuts 46 is preferably used for sash and ventilator frames of large dimensions, such as the mullions bearing hinges for the ventilator frames, whereas the base profile 30 having the top profile 37 affixed thereto by means of screws 49 and an iron latch 47 as described above will be primarily used to form frames of small dimensions. Thus, the base profile 30a, with uninterrupted channel wall 35 is used mainly where the strain exerted upon the frame structure is greatest. It will be necessary for example, to use this type of base profile where the ventilator frame is very high and large, as this is often the case with large modern windows.

The externally sloped shape of the top profile and the fixed profile are especially adapted to achieve the following ends: an easy downflow of rain water; sufficient space for the formation of a drip tray 70 to catch the condensation water at the bottom of the window plate and channel 71, through the putty 59 at the sill portion of the frame to facilitate the natural evaporation of this condensation water toward the outside, without requiring a special conduit. Finally the top profile and the fixed profile provide for the placement of the glass plates on the outside part of the frame and their attachment to the frame by ledge of putty or an attachment ledge.

The assembly of the various profiles heretofore described to the finished frame is extremely simple, as will be easily gathered from Figures 11–19.

In assembling a window frame from its various constituent parts there are only two basically different modes of assembly according to my invention.

They shall be called, rectangular assembly, and pivot assembly. "Rectangular assembly" is the assembly of two linear sections of the frame at an angle of 90° of one linear section to the other thus forming one "corner" of the window frame.

"Pivot assembly" is the assembly of the sill sections 15, 16, 17, 18 of ventilators 3 and 4, the pivots 23, 24, 25 and 26, and the adjoining head portions 6 and sill portion 9, respectively of the casing.

As shown by Figures 18 and 19, a base profile 30 forming the sill portion 9 of the casing is connected to another base profile 30, the latter forming together with top profile 37 sill section 17 of ventilator 3 (Figure 1) by pivot 25. Both sill section 9 of the casing and sill section 17 of the ventilator are reinforced by ledges 95 and 96 respectively, the latter being fastened to the sill sections by screws 97a and 97b, and 98a and 98b respectively.

According to my invention the two modes of assembly are extremely simple and can be effected by an unskilled person.

The rectangular assembly of a completely assembled linear frame section 90 composed of a base profile 30 and a top profile 37 and another similarly composed linear frame section 90a to form a corner of the frame is effected simply by using an angle iron 91 fastened to each of the linear frame sections by screws 92 and thus joining the two sections to form a right angle constituting a corner of the frame (Figures 16, 17).

The assembly of the corner XI of mullion 13 (Figure 1) is shown in Figure 11. It is effected by two angle irons 93 and 94 that are attached to one another by screw 99, thus forming a T-shaped attachment means with the foot of angle iron 93 being, however, shorter than that of angle iron 94.

These modes of attaching different frame sections to one another can be employed without regard to the type of profile (base-top-or fixed profile) making up the individual frame section.

The attaching means for forming corners or junctions between profiles and sections of the frame according to my invention can always be mounted in such a manner that they remain invisible from the outside. They can thus be made of steel or iron as well as of any other metal desired.

The advantages of the system according to my invention over the known art are quite obvious. Frames of the known types are not sufficiently balanced with regard to the different degrees of strain exerted upon their various parts.

Under the system of my invention described above, all weakened spots of the frame structure are reinforced by means of the top profile and reinforcing the same in particular at the hinge portion 80 being fastened to the exterior wall of the base profile.

Another advantage of my system consists of the remarkable simplicity of construction of the individual profiles as well as of their assembly to the entire frame system.

In the frame system according to my invention the glass panes or panels of other material may be mounted, at will, from the outside or from the inside of the window or door, the top profile being fastened on the base profile with the pane supporting flange in the desired position.

All the individual elements of the profile forming the frame are produced by punching the respective irons at an angle of 45° or 90° without requiring any indentures. The production is even more simple where the profiles are just mounted rather than welded. These mountings are effected at the back side of the wings of an angle iron having in all instances the same width. The ends of the mounting angle iron are entirely concealed. They can therefore consist of ordinary iron. By effecting the mounting at the back side of the wings the angle irons can have comparatively short wings. In addition, this way of mounting assures a perfect joint of the profiles attached to one another by the angle irons.

The base profile, the top profile and eventually the attaching ledges for the glass plates, can—after their bone cutting—be assembled before installing the frame. It is also possible to cut (saw) them with one single stroke at an angle of 45° for the wing.

Finally, the esthetic properties of the frame of my invention, the smaller number of profiles required and the negligible amount of machinery used for the production of the frame constitute decisive advantages over any kind of frame used or known heretofore.

What I claim is:

1. An elongated box member having vertically disposed laterally arranged depending skirts of different length, and a cap member detachably attached to the box member, said cap member having a flat central surface and inclined side surfaces and a single flange upstanding from one side edge of said central surface.

2. An elongated box member having vertically disposed laterally arranged depending skirts of different length, and a cap member detachably attached to the box member, said cap member comprising an angularly arranged plate with outward and inward longitudinal flanges on the underside thereof, and an upwardly extending rib on the top thereof having a longitudinal flange, the said top of the plate having a flat central surface and inclined side surfaces, and said rib being located at one side edge of the flat surface.

3. A composite frame for windows and doors and like wall openings which comprises the combination of a plurality of box members according to claim 2 interconnected to form the said frame and with the said cap members being detachably secured thereto so as to form the circumferential wall about the central opening of the frame.

4. An elongated box member having vertically disposed laterally arranged depending skirts of different length on one wall thereof, there being a longitudinally extending slot in the wall of said box member opposed from said one wall, means within said box member and protruding through said slot, and a cap member detachably attached to the box member by that portion of said means protruding through said slot, said cap member having a flat central surface and inclined side surfaces and a single flange upstanding from one side edge of said central surface.

5. An elongated box member having vertically disposed laterally arranged depending skirts of different length on one wall thereof, there being a longitudinally extending slot in the wall of said box member opposed from said one wall, and a cap member detachably attached to the box member on the slotted wall thereof, said cap member having a flat central surface and inclined side surfaces and a single flange upstanding from one side edge of said central surface.

References Cited in the file of this patent

UNITED STATES PATENTS

| | | |
|---|---|---|
| 1,608,672 | Rappaport | Nov. 30, 1926 |
| 2,282,531 | Schunk | May 12, 1942 |
| 2,445,428 | Goldberg | July 20, 1948 |
| 2,552,298 | Stiles | May 8, 1951 |
| 2,612,097 | Pollman | Sept. 30, 1952 |